United States Patent
du Plessis

(10) Patent No.: US 7,578,868 B2
(45) Date of Patent: Aug. 25, 2009

(54) METAL RECOVERY FROM A TANK BIOLEACHING SOLUTION WITH THE USE OF COATED MAGNETIC PARTICLES

(75) Inventor: Chris Andre du Plessis, Randburg (ZA)

(73) Assignee: BHP Billiton SA Limited (ZA)

( * ) Notice: Subject to any disclaimer, the term of this patent is extended or adjusted under 35 U.S.C. 154(b) by 0 days.

(21) Appl. No.: 12/102,295

(22) Filed: Apr. 14, 2008

(65) Prior Publication Data

US 2008/0223176 A1 Sep. 18, 2008

Related U.S. Application Data

(63) Continuation of application No. PCT/ZA2006/000116, filed on Oct. 6, 2006.

(30) Foreign Application Priority Data

Oct. 15, 2005 (ZA) ............................... 2005/07455

(51) Int. Cl.
*C22B 15/00* (2006.01)
*C22B 61/00* (2006.01)

(52) U.S. Cl. ........................................ 75/743; 75/710

(58) Field of Classification Search ................... 75/734, 75/743
See application file for complete search history.

(56) References Cited

U.S. PATENT DOCUMENTS 4,284,511 A    8/1981   Weitzen et al.
5,231,018 A *  7/1993   Shabtai et al. .............. 435/168
6,245,125 B1   6/2001   Dew et al.
6,953,120 B2 * 10/2005  Deveau et al. ................. 209/10

FOREIGN PATENT DOCUMENTS

| GB | 1568349 A | 5/1980 |
| JP | 53-146986 | 12/1978 |
| JP | 53146986 A * | 12/1978 |
| RU | 2225454 C | 3/2004 |

OTHER PUBLICATIONS

English abstract of JP53-146986.*
Database WPI Week 199311, Derwent Publications Ltd., London, GB; AN 1993-086122, XP002459225 & CN 1062302A (Metal Inst Chinese Acad Sci) Jul. 1, 1992 abstract.
Database WPI Week 200517, Derwent Publications Ltd., London, GB, AN 2005-153164; XP002459226 & CN 1544665A (Changchun Gold Res Inst) Nov. 10, 2004 abstract.
Database WPI Week 200054, Derwent Publications Ltd., London, GB, AN 2000-572909, XP002459227 & CN 1259583A (Univ Xiamen) Jul. 12, 2000 abstract.

(Continued)

*Primary Examiner*—Roy King
*Assistant Examiner*—Jie Yang
(74) *Attorney, Agent, or Firm*—Brinks, Hofer, Gilson & Lione; G. Peter Nichols

(57) ABSTRACT

Small magnetic particles are introduced into a solution which is subjected to a bioleaching process. The particles are coated with a substance which has a selective affinity for, and which interacts with, a metal in the solution. The particles are taken from the solution and the metal is recovered from the particles.

15 Claims, 2 Drawing Sheets

OTHER PUBLICATIONS

Database WPI Week 198951, Derwent Publications Ltd., London, GB, AN 1989-376819, XP002459228 & SU 1465453A (AS USSR Microbiol) Mar. 15, 1989 abstract.

Database WPI Week 198903, Derwent Publications Ltd., London, GB, AN 1989-021932, XP002459229 & SU 1407985A (Univ Dnepr) Jul. 7, 1988 abstract.

* cited by examiner

TRANSMISSION ELECTRON MICROSCOPY

METAL RECOVERY FROM A TANK BIOLEACHING SOLUTION WITH THE USE OF COATED MAGNETIC PARTICLES

This application is a continuation of and claims priority to PCT application PCT/ZA2006/000116 filed Oct. 6, 2006, published in English as WO 2007/118257 on Oct. 18, 2007 and to South African application no. 2005/07455 filed Oct. 15, 2005, the entire contents of each are incorporated herein by reference.

BACKGROUND OF THE INVENTION

This invention relates generally to tank bioleaching of a base metal.

In tank bioleaching of a sulphide concentrate which contains a metal such as copper, nickel, cobalt or zinc, the particular compounds are rendered soluable and are therefore recoverable from solution by making use of an appropriate technique. Some metal compounds, however, which are associated with the concentrate, are not rendered soluble during the bioleaching process. Typically these are compounds of metals such as silver, gold, platinum and palladium which are found in a non-soluble particulate fraction of a bioleaching residue, either complexed among mineral precipitates or in unoxidized original mineral concentrate fractions.

Under the bioleaching conditions these compounds are either completely insoluble (e.g. gold) or are transiently soluble (e.g. silver). While silver is momentarily dissolved under bioleaching conditions (i.e. is transiently soluble), it is rapidly removed from solution by chemical precipitation reactions which typically result in argentojarosite, $AgFe_3(SO_4)_2(OH)_6$. Equilibrium soluble silver concentrations in typical high temperature bioleaching solutions, for sulphide mineral concentrations that contain small quantities of silver, are usually less than 3 mg/t.

FIG. 1 indicates that silver in a transient soluble phase 12, before being removed from solution by precipitation 52, interacts particularly with archaea cells 50 used in a high temperature bioleaching process. Such interaction involves the rapid transfer of silver across the cell membrane where the silver most likely interacts, with high affinity, with compounds contained in the cell cytoplasm and eventually results in the formation of silver nodules inside the cell. FIG. 2 shows that this phenomenon is clearly observable by transmission electron microscopy. Cellular constituent compounds with a high affinity for silver may be sulphur-containing amino acids or the imidizole group of histidine, amongst others. The result of such cross-membrane transfer and internal cell accumulation of silver is that the microbial activity and growth are severely affected, to the extent that these factors may render a bioleaching process inoperable.

Transiently-soluble silver is particularly damaging to bioleaching archaea (used for high temperature bioleaching at 60° C- 80°C), while bacteria used in low temperature bioleaching at 30°C- 45°C are relatively unaffected. The difference in sensitivity to silver in this context is mainly ascribed to the known differences in bacteria and archaea cell membrane structures, chemistry and configuration.

In some instances, due to the specific solution chemistry, operating conditions, or microbial population utilized, or a combination of these factors, the silver does not unduly accumulate in the microbial cells and an active bioleaching process of a silver-containing sulphide mineral concentration can be achieved. The result of such a process, however, is that the silver reports to the residue, mainly as argentojarosite. Recovery of the silver from this residue is expensive and requires a significant amount of processing, either by smelting or by hydrometallurgical processing.

Base metals, such as copper, are generally not inhibitory to archaea cells, but some form of inhibition is encountered at concentrations above 10 g/l. The operation of bioleaching tanks where the copper concentration is about 30 g/l. causes a reduction in microbial activity. It is thus desirable to place a ceiling on the metal-concentrate processing rate in order to avoid soluble copper concentrations levels which exhibit severe inhibitory effects. A benefit would be that the ceiling would prevent solution copper concentrations from reaching inhibition levels and thus allow for increased throughput and processing rates of copper concentrates.

SUMMARY OF INVENTION

The invention is concerned with a metal recovery process which is suitable for use under the aforementioned conditions.

The invention provides a method of recovering a metal from a bioleaching solution in a bioleaching reactor which includes the steps of introducing a substance into the solution which has a selective affinity for the metal in the prevailing reactor physical and chemical conditions, allowing the substance to interact with the metal, separating the substance from the solution, and removing the metal from the separated substance.

In one form of the invention the substance comprises a plurality of small magnetic particles. These particles are sufficiently small to ensure that they remain suspended in the bioleaching solution. The outer surface of each particle has a selective and high affinity for the metal and preferably this is achieved by surface coating each particle with a suitable material which simulates the metal-binding constituent compounds of the archaea cells.

For example, when the method is used for the recovery of copper, the surface coating has a selective and high affinity for copper. A benefit of this process is that, apart from recovering copper, it prevents the solution copper concentration from reaching an inhibitory level, and thus allows for increased throughput and processing rates of copper concentrates. A similar situation prevails if the targeted metal is silver.

The method can be used for recovering metal, as a primary objective or for recovering metal so that adverse effects related to the presence of metal in solution or to a high metal concentration are reduced.

The particles may be introduced into the reactor prior to reactor startup and thereafter can be introduced in a controlled manner, e.g. continuously, into the reactor.

The concentration of the particles and the size of the particles may be varied to achieve a desired effect.

The particles may be separated from the solution by making use of magnetic or electromagnetic techniques or density or specific gravity separation processes.

The metal may be removed from the separated particles in any appropriate way. Preferably this is achieved in a way which permits the metal-adsorbing particles to be reused for multiple cycles of silver removal and desorption. This may be done after the particles have been recoated with the selective coating, if necessary.

The aforementioned method finds particular application when the bioleaching reactor is operated at a relatively high temperature for example in excess of 45° C. and typically in the temperature range of 60° C. to 80° C.

In a variation of the invention suitable for use in a mesophilic tank bioleaching process, i.e. where the bacteria are typically used in a temperature range of from 35° C. to 45° C.

the magnetic particles are employed to recover silver directly from solution and to prevent silver precipitation, with the further aspect of protecting the bioleaching cells from the detrimental effects of silver being of a secondary nature. This objective is possible because the bacteria which are suitable for use in a mesophilic operation are less sensitive to the adverse effects of silver than bioleaching archaea.

In a variation of the invention, also applied to the recovery of silver, the substance includes, in addition to or in place of the magnetic particles, an archaea cell suspension. Such archaea cells, which are known to be effective in internally accumulating silver, are added to the bioleaching solution from an external source to react with the silver in the solution. Objectives in this regard are to prevent the interaction of silver with the bioleaching archaea, and the silver from precipitating.

The cells which accumulate silver may be recovered from the bioleaching liquor by any suitable method which may include centrifugation, gravitational settling, filtration, and electrophoretic or magnetophoretic separation.

The archaea cells which are added may be derived from any appropriate source such as the effluent of a bioleaching plant or from heterotrophically-cultured archaea cells.

BRIEF DESCRIPTION OF THE DRAWINGS

The invention is further described by way of example with reference to the accompanying drawings in which.

DESCRIPTION OF PREFERRED EMBODIMENT

Figure 1:
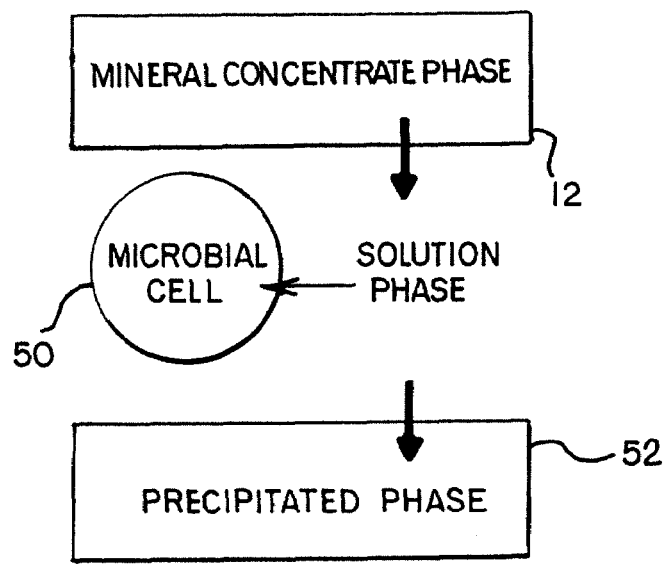
FIGS. 1 and 2, which have been referred to in the preamble hereto, relate to the effect of silver on archaea cells.
Figure 2:
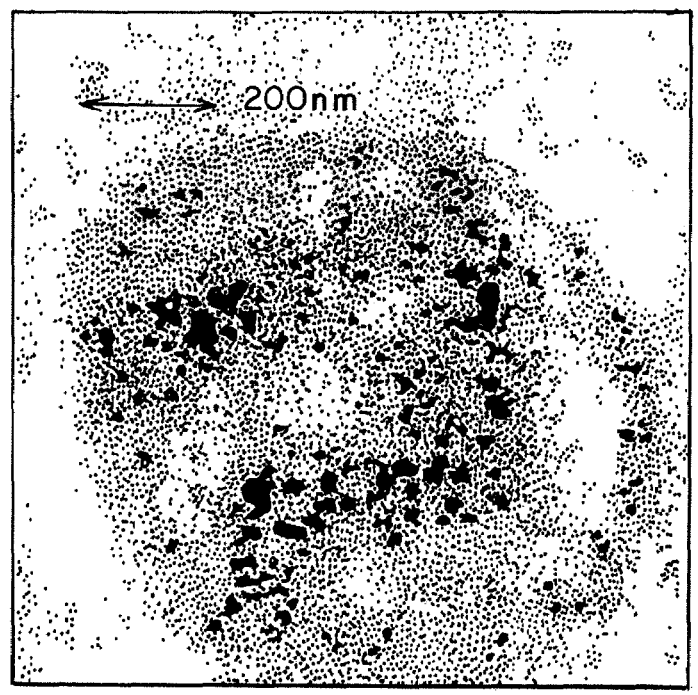
Figure 3:
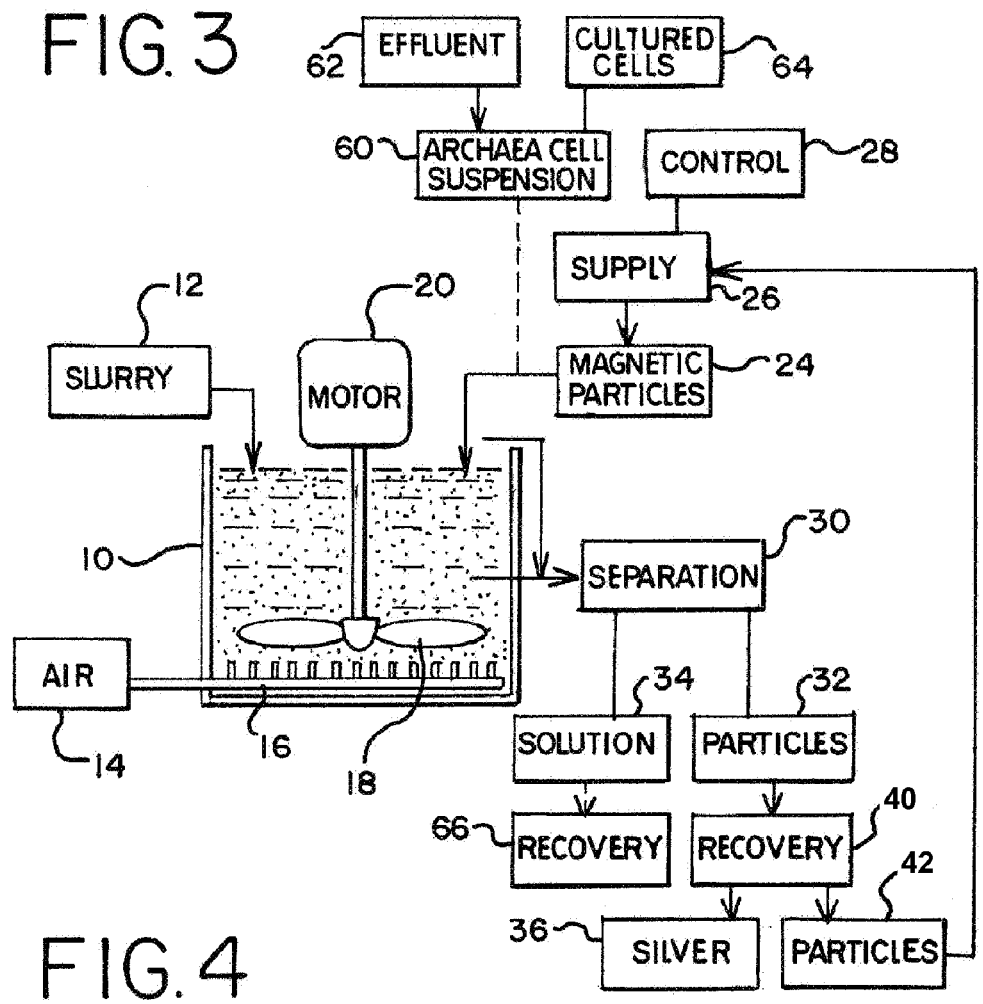
FIG. 3 is a block diagram representation of a tank bioleaching operation based on the principles of the invention.

FIG. 3 of the accompanying drawings illustrates a bioleaching reactor 10 to which is added a slurry 12 which contains at least one or more base metals and a silver compound. Air 14 is sparged via a diffuser 16 into the slurry in a lower region of the reactor. The air may be enriched with oxygen or carbon dioxide or both. The reactor is agitated by means of an impeller 18 which is driven in a controlled manner by a motor 20.

Small magnetic particles 24 are derived from a suitable source 26 and are fed in a regulated manner, determined by a control unit 28, to the reactor prior to startup, and during operation, of the reactor. The particles are sufficiently small to ensure that they remain in suspension in the slurry in the reactor. The particles are coated beforehand using any appropriate technique with a suitable compound that exhibits a selective and high affinity for silver in the prevailing chemical and physical conditions in the reactor 10. Typically, without being limiting, this compound emulates the silver-binding constituent compounds of the archaea cells which are used in a thermophilic bioleaching process at a temperature in the range of from 60° C. to 80° C.

The particles do not interact with microbial cells nor do they cause microbial absorption onto cells which could obscure interaction of the particles with transiently-soluble silver.

The silver contained in the slurry is momentarily dissolved under the bioleaching conditions in the reactor i.e. the silver is transiently soluble.

The soluble silver interacts with the magnetic particles at a rate which exceeds the rate of precipitate formation and the rate of interaction with microbial cells.

Bioleached liquor from the reactor, collected via an overflow or outflow connection, is directed to a separation stage 30 in which coated particles 32 which have interacted with the silver are separated from solution 34 using any appropriate technique such as density or specific gravity processes or magnetic or electro-magnetic methods. Silver 36 is then recovered from the coated particles 32 in a recovery step 40.

Preferably the absorption of the silver onto the surfaces of the coated particles is reversible so that the silver can be detached from the particles. The resulting silver-free particles 42 can be reused either directly or after recoating with the selective and high affinity compound. The coated and recovered particles are recycled to the supply source 26.

The average residence time of the particles in the reactor can be equal to or exceed the hydraulic retention time of the reactor.

Figure 4:
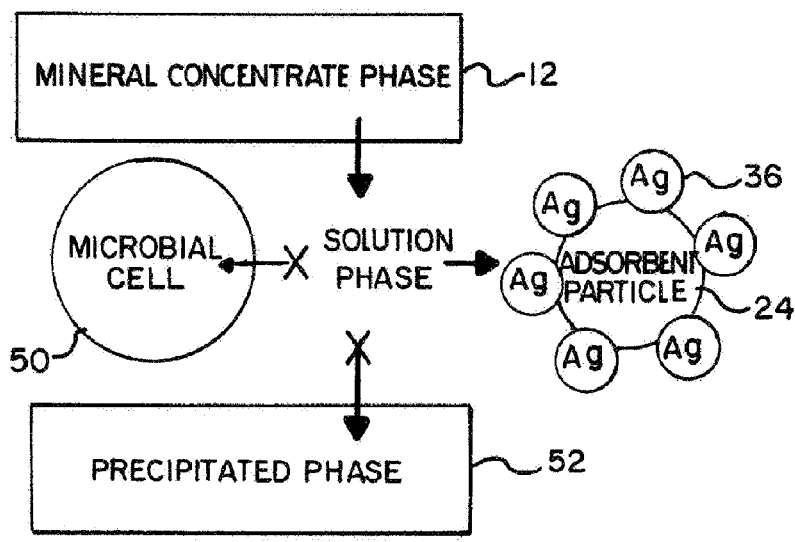
FIG. 4 illustrates benefits which can be achieved through the use of the invention.

As the silver is rapidly and with high affinity removed from solution by the magnetic particles a number of important benefits are achieved, as is illustrated in FIG. 4.

The particles 24 prevent the interaction of silver with microbial cells 50 in solution and thus make possible a functional archaea-based high temperature tank bioleaching process in the presence of a silver-containing concentrate 12. Silver is prevented from being precipitated (block 52) thereby circumventing the problem of recovering silver from precipitated inorganic residue.

The direct recovery of silver from solution can result in significant operational and cost advantages and can extend the process niche for particularly high temperature bioleaching processes.

In a variation of the invention the magnetic particles are used in a mesophilic tank bioleaching process as opposed to a thermophilic process. In the former process bacteria are used in a typical temperature range of from 35° C. to 45° C. In this instance the main objective is to recover silver directly from solution and to prevent silver precipitation. The protection of the bioleaching cells from the detrimental effects of silver is a lesser objective.

In another variation of the invention (see FIG. 3) an archaea cell suspension 60 is used in place of or in addition to the magnetic particles 24 to recover silver from the solution phase in the reactor.

The archaea cells are effective in allowing internally accumulating silver. This prevents the interaction of silver with the bioleaching archaea and prevents silver precipitation.

The archaea cells which are added can be derived from any appropriate source such as an effluent 62 of a bioleaching plant or from heterotrophically cultured archaea cells 64.

The silver accumulating cells are recovered from the bioleach liquor 34 by a suitable method 66 which can include centrifugation, gravitational settling, filtration, or electrophoretic or magnetophoretic separation. Silver is then extracted from the recovered cells.

The invention has been described with particular reference to the recovery of silver. As indicated, however, similar techniques can be employed to recover copper from solution, and to limit high copper concentrations in solution. Other base metals such as nickel and zinc can also be selectively recovered through the use of appropriately coated magnetic particles.

The invention claimed is:

1. A method for recovering silver from a bioleaching solution in a bioleaching reactor comprising:

a) coating a plurality of small magnetic particles with a surface coating that simulates metal-binding constituent compounds of archaea cells;
b) introducing the plurality of coated small magnetic particles into the bioleaching solution;
c) allowing the magnetic particles to interact with the silver at a rate that exceeds a rate of silver precipitation and a rate of interaction with the archaea cells;
d) separating the magnetic particles from the solution, and removing the silver from the separated magnetic particles.

2. A method according to claim 1 wherein the magnetic particles are sufficiently small to ensure that they remain suspended in the bioleaching solution.

3. A method according to claim 1 wherein the magnetic particles are introduced into the reactor in a controlled manner prior to start up of the reactor.

4. A method according to claim 3 wherein, after start up, the magnetic particles are continuously introduced.

5. A method according to claim 1 wherein after silver is removed from the separated magnetic particles, the particles are reused for multiple cycles of silver removal and desorption.

6. A method according to claim 1 wherein the bioleaching reactor is operated in a temperature range of from about 35° C. to about 45° C.

7. A method according to claim 1 wherein the bioleaching reactor is operated at a temperature in the range of about 60° C. to about 80°C.

8. The method for recovering a metal selected from copper. silver, nickel or zinc from a bioleaching solution in a bioleaching reactor comprising:

a) coating a plurality of small magnetic particles with a surface coating that simulates metal-binding constituent compounds of archaea cells;
b) introducing the plurality of small magnetic particles into the bioleaching solution;
c) allowing the magnetic particles to interact with the metal, at a rate that exceeds a rate of metal precipitation and a rate of interaction with the archaea cells;
d) separating the magnetic particles from the solution, and removing the metal from the separated magnetic particles.

9. A method according to claim 8 wherein the magnetic particles are sufficiently small to ensure that they remain suspended in the bioleaching solution.

10. A method according to claim 8 wherein the magnetic particles are introduced into the reactor in a controlled manner prior to start up of the reactor.

11. A method according to claim 10 wherein, after start up, the magnetic particles are continuously introduced.

12. A method according to claim 8 wherein the metal includes copper and the surface coating of each magnetic particle has a selective affinity for copper.

13. A method according to claim 8 wherein after the metal is removed from the separated magnetic particles, the particles are reused for multiple cycles of metal removal and desorption.

14. A method according to claim 8 wherein the bioleaching reactor is operated in a temperature range of from about 35° C. to about 45°.

15. A method according to claim 8 wherein the bioleaching reactor is operated at a temperature in the range of about 60° C. to about 80°C.

* * * * *